(12) United States Patent
Jones et al.

(10) Patent No.: US 10,937,102 B2
(45) Date of Patent: Mar. 2, 2021

(54) RESOURCE ALLOCATION

(71) Applicant: Aetna Inc., Hartford, CT (US)

(72) Inventors: William R. Jones, Cromwell, CT (US);
Gaurav Sharma, Wilton, CT (US);
Faisal Khan, Fishkill, NY (US);
Hualiang Li, New Britain, CT (US);
Yue Xiao, West Hartford, CT (US);
Jingran Li, New Britain, CT (US);
Jamal Timsah, Grand Prairie, TX (US);
Ryan T. Berns, Southbury, CT (US);
Sanjeev Bollam, Hartford, CT (US);
Radhika G. Athalye, Sunnyvale, CA (US)

(73) Assignee: Aetna Inc., Hartford, CT (US)

(*) Notice: Subject to any disclaimer, the term of this patent is extended or adjusted under 35 U.S.C. 154(b) by 727 days.

(21) Appl. No.: 15/389,832

(22) Filed: Dec. 23, 2016

(65) Prior Publication Data

US 2017/0186093 A1    Jun. 29, 2017

Related U.S. Application Data

(60) Provisional application No. 62/387,190, filed on Dec. 23, 2015.

(51) Int. Cl.
*G06Q 40/00* (2012.01)
*G06Q 40/08* (2012.01)
(Continued)

(52) U.S. Cl.
CPC ............ *G06Q 40/08* (2013.01); *G06N 20/00* (2019.01); *G06Q 30/0205* (2013.01)

(58) Field of Classification Search
CPC ..... G06Q 40/08; G06Q 30/0205; G06N 20/00
See application file for complete search history.

(56) References Cited

U.S. PATENT DOCUMENTS

| 7,516,079 B2 * | 4/2009 | Harrison | G06Q 40/08 705/4 |
| 8,571,900 B2 * | 10/2013 | Belhe | G06Q 40/08 705/35 |

(Continued)

FOREIGN PATENT DOCUMENTS

| JP | 2003-157358 | * | 5/2003 | ............ G06Q 40/08 |
| WO | WO-2006031747 A2 * | 3/2006 | ............ G06Q 40/08 |

OTHER PUBLICATIONS

Data Engineering (Year: 1999).*

(Continued)

*Primary Examiner* — Alexander G Kalinowski
*Assistant Examiner* — William B Bunker
(74) *Attorney, Agent, or Firm* — Leydig, Voit & Mayer, Ltd.

(57) ABSTRACT

Embodiments of the disclosure provide a system and method of allocating a resource based on myriad input data. In some embodiments, the myriad input data include membership information, claims data, transactional data, etc. The myriad input data are sorted and organized in a meaningful association relationship before applied to a resource allocation modeling algorithm. The resource allocation modeling algorithm provides estimated resource necessary for the application chosen. For example, an insurance company may use membership information, claims data, transactional data, etc., to estimate how much reserves or funds it should hold to cover future claims within a certain timeframe.

21 Claims, 12 Drawing Sheets

(51) Int. Cl.
    *G06Q 30/02*     (2012.01)
    *G06N 20/00*     (2019.01)

(56) References Cited

U.S. PATENT DOCUMENTS

| | | | | |
|---|---|---|---|---|
| 2005/0080653 | A1* | 4/2005 | Stemple | G06Q 40/08 705/4 |
| 2005/0222922 | A1* | 10/2005 | Lynch | G06Q 40/08 705/30 |
| 2006/0116914 | A1* | 6/2006 | Stemple | G06Q 40/08 705/4 |
| 2006/0136273 | A1* | 6/2006 | Zizzamia | G06Q 40/08 705/4 |
| 2007/0112604 | A1* | 5/2007 | Caballero | G06Q 40/08 705/4 |
| 2009/0048877 | A1* | 2/2009 | Binns | G06Q 50/22 705/4 |
| 2012/0143634 | A1* | 6/2012 | Beyda | G06Q 10/06 705/4 |
| 2013/0066826 | A1* | 3/2013 | McDonald | G06F 16/254 707/602 |

OTHER PUBLICATIONS

Braun et al., "A Neural Network Linking Process for Insurance Claims," Proceeding, Fourth International Conference on Machine Learning and Cybernetics, IEEE (Year: 2005).*

Thomas Mack, "A Simple Parametric Model for Rating Automobile Insurance or Estimating IBNR Claims Reserves," ASTIN Bulletin, vol. 21, No. 1 (Year: 2014).*

* cited by examiner

RESOURCE ALLOCATION

CROSS-REFERENCE TO RELATED APPLICATIONS

This patent application claims the benefit of U.S. Provisional Patent Application No. 62/387,190, filed Dec. 23, 2015, which is incorporated by reference.

BACKGROUND

Certain institutions are required to have enough resources to cover any incurred or future costs. Sometimes, the existence of these allocated resources or funds is mandated by governing bodies, for example, country and state governments. In some examples, financial institutions are required to have a certain amount of reserve money as a percentage of deposits in order to be able to cover daily withdrawals or emergency withdrawals from their customers. In another example, insurance companies are required to hold enough reserve money to cover any incurred claims.

The process of determining an amount of reserve money currently employed by insurance companies is conservative due to volatility in current reserving models. Sometimes information needed to accurately predict the required reserve amount is not received until months later. Current methodologies deal with this information lag by providing an incredible margin of safety that burdens institutions with requirements to hold a large amount of capital on hand in the form of reserves money. Large amount of capital on hand may adversely impact an institution's ability to invest in the future.

BRIEF SUMMARY

Embodiments of the disclosure provide a system and method of allocating a resource based on myriad input data. In some embodiments, the myriad input data include membership information, claims data, transactional data, etc. The myriad input data are sorted and organized in a meaningful association relationship before being applied to a resource allocation modeling algorithm. The resource allocation modeling algorithm provides estimated resources necessary for the application chosen. For example, an insurance company may use membership information, claims data, transactional data, etc., to estimate how much reserve money or funds it should hold to cover future claims within a certain timeframe.

In one embodiment, a method for estimating reserves for an insurance carrier using a data platform configured to collect data from one or more source systems is provided. The method includes: collecting reserves relevant data from one or more data source systems over a system defined time period; converting the reserves relevant data into a reserves relevant data matrix, wherein the reserves relevant data matrix comprises a plurality of features based on the reserves relevant data that are organized based on the system defined time period; storing the reserves relevant data matrix at a reserves database of the data platform; executing a predictive model for each of the plurality of features of the reserves relevant data matrix to extrapolate a trend for each individual feature; and combining the trend for each individual feature to obtain a reserves estimate.

In another embodiment, a method for geographically allocating reserves for an insurance carrier using a data platform configured to collect data from one or more source systems is provided. The method includes: collecting reserves relevant data from one or more data source systems from a plurality of geographic regions over a system defined time period; converting the reserves relevant data into a reserves relevant data matrix, wherein the reserves relevant data matrix comprises a plurality of features based on the reserves relevant data that are organized based on the plurality of geographic regions and the system defined time period; storing the reserves relevant data matrix at a reserves database of the data platform; executing a predictive model for each of the plurality of features of the reserves relevant data matrix to extrapolate a trend for each individual feature within a geographic region of the plurality of geographic regions; and combining the trend for each individual feature within the geographic region to obtain a reserves estimate for the geographic region.

In a further embodiment, a user interface for interacting with reserves relevant data collected from reserves relevant data sources and being utilized for estimating reserves for an insurance carrier is provided. The user interface includes a predictive variable interface configured to display the reserves relevant data collected from the reserves relevant data sources, wherein the predictive variable interface displays the reserves relevant data over a selected time period. The user interface further includes a predictive model interface configured to display, over the defined time period, a predictive model performance and a predictive model variance for reserves estimates made based on the reserves relevant data over the selected time period.

In yet another embodiment, a non-transitory computer readable medium containing computer executable instructions for estimating reserves for an insurance carrier using a data platform configured to collect data from one or more source systems is provided. The computer readable instructions, when executed by a processor, cause the processor to perform steps including: collecting reserves relevant data from one or more data source systems over a system defined time period; converting the reserves relevant data into a reserves relevant data matrix, wherein the reserves relevant data matrix comprises a plurality of features based on the reserves relevant data that are organized based on the system defined time period; storing the reserves relevant data matrix at a reserves database of the data platform; executing a predictive model for each of the plurality of features of the reserves relevant data matrix to extrapolate a trend for each individual feature; and combining the trend for each individual feature to obtain a reserves estimate.

DETAILED DESCRIPTION

Embodiments of the disclosure describe a system for determining reserves an institution should have on hand to cover various operational challenges. A goal of the provided system is to utilize recent data combined with other data to increase granularity of information and apply a prediction methodology to the collected data to determine a reserve amount. In some embodiments, this system may be used in the medical insurance field. The medical insurance field will be used as an example in describing exemplary features of the system.

Figure 1A:
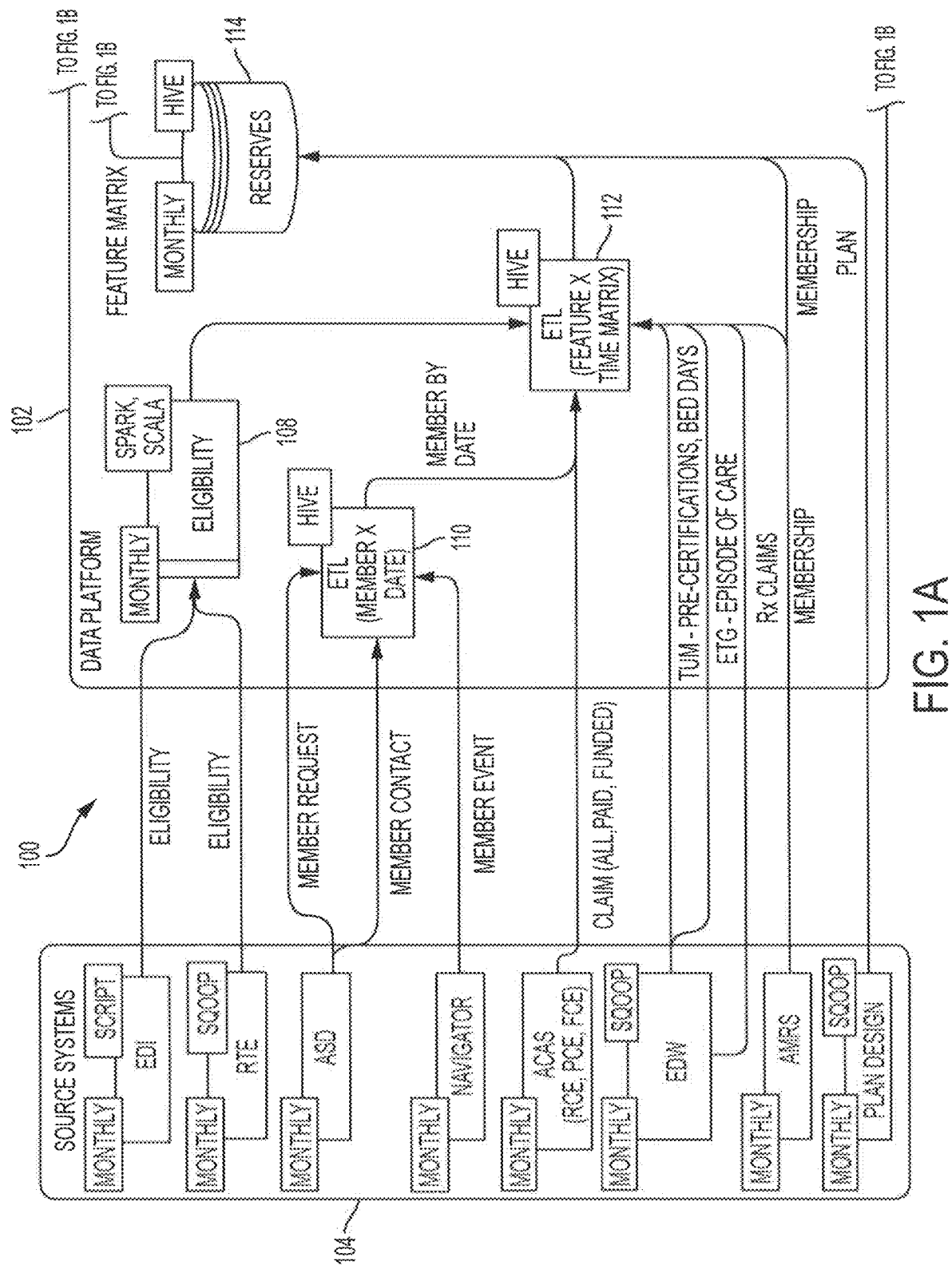
FIGS. 1A and 1B provide an embodiment of a system schematic for determining cash reserves.
Figure 1B:
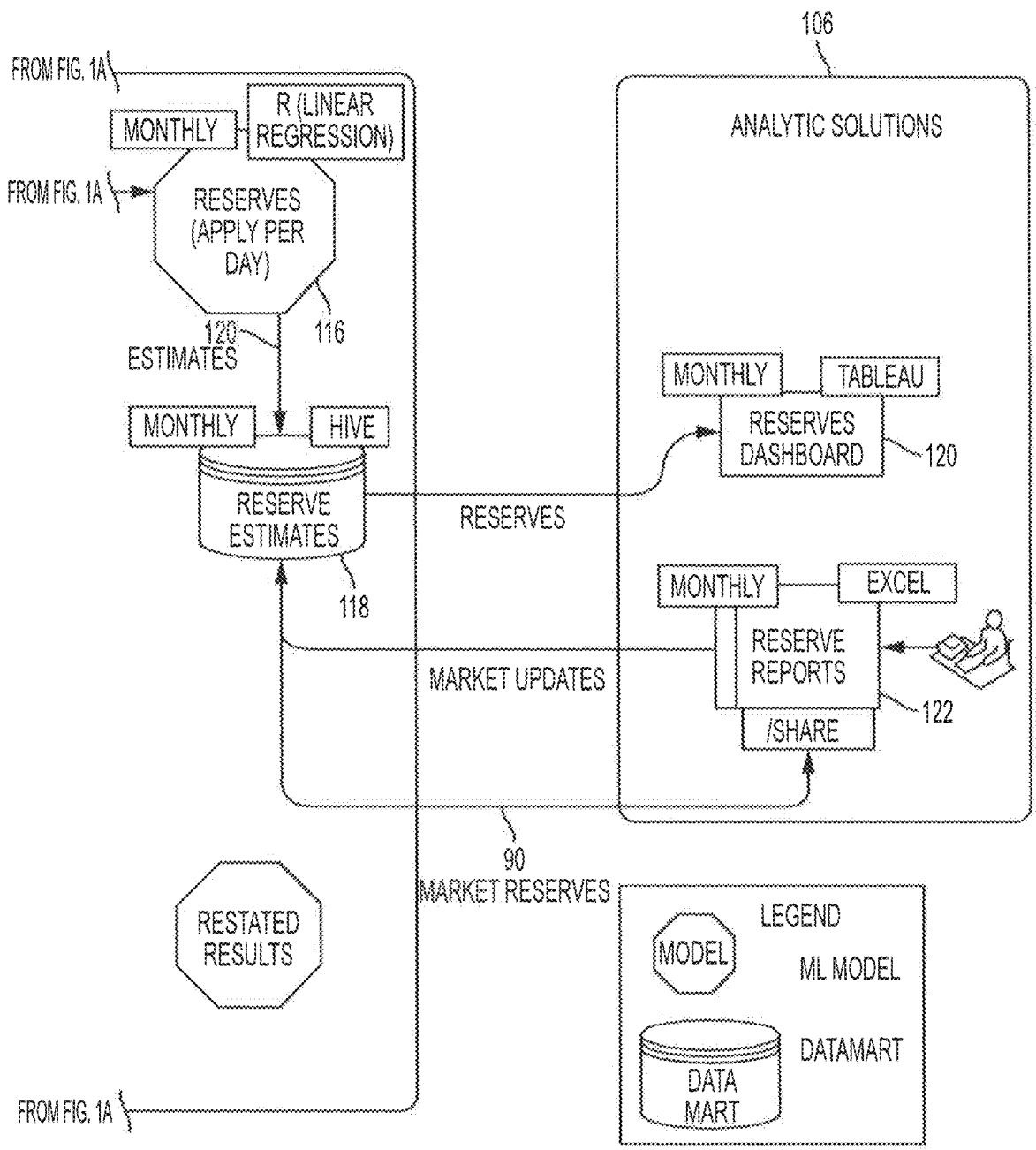

FIGS. 1A and 1B illustrate an embodiment of a reserves determination system 100 in the context of a medical insurance provider. FIGS. 1A and 1B illustrate an embodiment of a single system using two figures such that the system is more easily readable. For brevity sake, we will refer from here on to FIG. 1, which is collectively meant to refer to FIGS. 1A and 1B as illustrating the reserves determination system 100.

In FIG. 1, information flow is shown to progress from Source Systems 104 to Data Platform 102 and then to Analytic Solutions 106. Source Systems 104 may include, for example, information obtained from an Electronic Data Interchange (EDI), databases processing real time eligibility (RTE), call centers like Automated Systems Design (ASD), a Navigator for collecting member events, claims database (Claims dB), enterprise data warehouse (EDW), a membership database (AMRS), and Plan Design. Navigator is the institution's personal website where clients may make queries. Plan Design is a particular plan offered, which may include information relating to copayments, out of pocket maximums, coverage in and out of network, cost of emergency room (ER) visits, premium services, etc.

The Source Systems 104 may provide data relating to claims data, transactional data, pre-certifications, eligibility request, membership data, prescription data, benefits data, ASD calls, episodes of care, weather, care management, provider contracts, lab results, etc. Claims data may include claims paid and incurred within a timeframe. For example, claims data may include paid and incurred claims in the current month, claims paid and incurred one month ago, claims currently pending, and account payable (AP) held claims. AP held claims are claims held while information related to the claim is being investigated. The number of pre-certifications over a timeframe may be collected, for example, over the past 90 days. Pre-certification procedures are performed before certain activities to ensure a client or patient knows insurance coverage for procedures, and the data obtained during the pre-certification process may allude to future costs the insurance provider should anticipate. The number of eligibility requests over a period of time, for example, 15 days, may be obtained. All of this data may provide an indication of future claims, and, therefore, is useful for determining the amount of reserves the insurance provider should hold.

Membership data and benefits data may include age information, gender information, deductibles, out of pocket (OOP) maximums, co-insurance, etc. Prescription data and transaction data over a certain time period may provide insight to future costs. For example, number of new prescriptions in the past 28 days and the number of prescriptions in the past 28 days may be collected. Patient expenditure on transactions like non-prescription medication, other therapies, or over the counter diagnoses or monitoring devices may also be classified under transactional data collected. In certain aspects, information like bed days, that is, the number of days a patient is housed in a care facility is a lead indicator for predicting future expenditure. In other examples, episodes of care data which provide average episodes of care dollars are used as input data to the system. Episodes of care correspond to a collection of claims that are grouped together for certain conditions. For example, a heart attack or pregnancy may have a collection of claims for an episode of care. These episodes may be chronic or non-chronic as evidenced in the distinction between pregnancy and diabetes. In some instances, weather related information may be collected. These include road accident and ski accident data.

FIG. 1 shows example frequencies or time periods associated with the different information sources under Source Systems 104. In addition to the different time periods, some show different modalities of achieving information transfer to the Data Platform 102, for example, through Script or Sqoop. In the exemplary embodiment of FIG. 1, Sqoop is used to input data into Apache Hadoop, and Script is used in general to depict customized scripts and modeling for the information flow.

Data Platform 102 provides an overview of the different modes of organizing the disparate data collected from the Source Systems 104. EDI and databases storing RTE data provide eligibility data, for example, on a monthly basis and the information obtained is pooled as Eligibility 108. Member events are provided by ASD and Navigator and processed through extracting, transforming, and loading (ETL) 110 the data to associate member activity with date information. This association creates a reserves relevant data matrix that contains the data from the ASD and Navigator systems organized as features and based on a system defined time period, such as the aforementioned date information. Member events may include phone calls, member online usage, etc. In some examples, members may search for a doctor or a specialist online using a computer or a phone, and this information may be an indicator of a future expense/claim since a specific doctor is being sought after. All of this data is then extracted, transformed and loaded by the ETL 110 into a plurality of features organized over the system defined time period into the reserves relevant data matrix.

Claims dB, EDW, and AMRS provide additional information about patient medical information. For example, claims data, pre-certifications, bed days, episodes of care, prescription data, and membership information may be combined with patient activity information, associating features provided with date or time information in another extracting, transforming, and loading (ETL) 112. As such, in the illustrated embodiment, the ETL 112 combines the reserves relevant data matrix created by ETL 110 with data from the Claims dB, EDW and AMRS Source Systems 104. This combination creates another reserves relevant data matrix containing the data from the various systems from Source Systems 104 organized over the system defined time period. Similar to the above description of ETL 110, the reserves relevant data matrix created by the ETL 112 also organizes the data from the Source Systems (Claims dB, EDW and AMRS) into a plurality of features organized over the system defined time period.

The system defined time period can be set by a user of the Data Platform 102. Further, this time period can be changed based on a desired collection of data to analyze. For instance, in one embodiment, a user may desire to collect and organize all reserves relevant data over a month, while in another embodiment, the user may desire to obtain all reserves relevant data over the past 10 days. As such, the system defined time period is variable and can be set over any time period desired.

The Data Platform 104 in the illustrated embodiment of FIG. 1 includes two ETLs 110 and 112. However, in other embodiments, more or fewer ETLs may be utilized. For instance, a single ETL could collect and convert all of the reserves relevant data into a reserves relevant data matrix over the system defined time period. Additionally, several ETLs may be present, such as an ETL for each input from the Source Systems 104, which in turn may feed any number of other ETLs for a chain of extracting, transforming, and loading of the data.

Returning to the illustrated embodiment, all of the Source Systems 104 data collected thus far and the pre-sorting and pooling of the data is further combined and stored in a Reserves database 114. In some embodiments, the data stored in the Reserves database 114 is monthly data, while in other embodiments the data may be over a period of days. The Reserves database 114 then serves as a repository to supply a feature matrix that when coupled with statistical algorithms like linear regression provides reserve estimates that may be stored in the Reserve Estimates database 118. In certain embodiments, instead of dealing with large databases, datamarts are used after combining collected data at different stages and extracting important features most relevant to estimating the reserves.

The different databases in Data Platform 102 are shown as separate databases, but these may be a single or distributed database physically housed at different locations. In some embodiments, Apache Hadoop is used for interfacing with Data Platform 102, therefore Apache Hive infrastructure is used for data summarization, query, and analysis. In some embodiments, Spark with Scala may be used in addition to the Hadoop framework as shown in FIG. 1 where Eligibility 108 uses Spark and Scala for increased speed due to in-memory processing of large amounts of data.

The Reserves Model 116 in FIG. 1 serves to analyze, clean up, and organize data before storing the data in the Reserves Estimates database 118 (or in some cases datamart). In some embodiments, the Reserves Model 116 makes a prediction and stores the predicted results in the Reserves Estimates database 118. The Reserves Model 116 makes its prediction based on reserves relevant data matrix from Reserves database 114 by applying a data modeling function to the various features collected and organized in the reserves relevant data matrix. In certain embodiments, this data modeling applies a predictive model that develops a trend and extrapolates that trend for each feature organized in the reserves relevant data matrix. The various trends developed for each feature are then combined to obtain the reserves estimate.

In a particular embodiment, each trend may be assigned a weighting value such that combination with other weighted trends, by the Reserves Model 116, affects the overall combination determining the reserves estimate. In this manner, certain features can affect the reserves estimate more or less based on the assigned weight. The weight can be assigned per feature either automatically by the Data Platform 102 or via user input at a user interface at the Analytic Solutions 106. The weight can be applied prior to determining the reserves estimate or post determination when already stored in the Reserve Estimate database 118. For instance, in one exemplary embodiments, the trends utilized by the Reserves Model 116 may be a cumulative claims paid two months ago assigned a weight of 0.09069, a cumulative claims paid four months ago assigned a weight of −0.03864, a pending claims assigned a weight of 0.35105, claims waiting to be funded assigned a weight of 0.93229, claims waiting to be paid assigned a weight of 0.78372, eligibility requests assigned a weight of 7.78668, and approved bed days assigned a weight of −760.86141.

Examples of various data/predictive modeling functions are a linear regression, a non-linear regression, a support vector machine, a neural network, a decision tree, a random forest, or a time series analysis. The previous list is not exclusive, as other data/predictive modeling functions may be contemplated. Further, the Reserves Model 116 may apply its data model at various time periods, as requested by a user, or on a system defined/preset basis.

In some embodiments, the predictions include statistical reallocation of reserves based on new information, thus providing a feedback system between the Reserves Model 116 and the Reserves Estimates database 118. In some embodiments, the Reserves Estimates database 118 is organized on a macro level, providing, for example, reserves needed for a certain territory like a country, such as the whole United States. In other embodiments, the Reserves Estimates are organized on a micro level, providing reserves needed for a certain region, like a state or local municipality. In other embodiments, a combination of regions or territories, for example, a grouping of countries or states. These may include reserve estimates for North America, Scandinavia, etc. or reserve estimates for the Northeast or Midwest, etc. In these embodiments, the data collected from Source Systems 104 is done so based on the desired region or regions. The ETL, such as ETLs 110 and 112 will further convert the data such that it is organized not just over the system defined time period but also per region/regions.

Additionally, in certain embodiments, the Reserves Estimates database 118 may be organized at the individual level. In these embodiments, data from Source Systems 104 may be collected at the individual member level in order to determine an amount of reserves apportioned to the individual member.

In FIG. 1, after the Data Platform 102, data flows from the Reserves Estimates database 118 towards Analytic Solutions 106. Analytic Solutions 106 comprises modes of using or displaying information contained in the Reserves Estimates database 118 (embodiments of which are illustrated in FIGS. 5-10). For example, Analytic Solutions 106 may display estimated reserves data in Tableau or other data visualization products. In other embodiments, Analytic Solutions 106 may include creating Reserve Reports in Microsoft Excel or other programs. In some embodiments, a user of the report is able to use new market data to update information in the Reserves Estimates database 118. For instance, new market data useful for updating information in the Reserves Estimates database 118 would be a change in deductible amounts, eligibility requests and other such data relevant to a certain market, such as healthcare.

Embodiments of the system thus provided create models at macro, micro, and even individual member levels. The models may be used to predict not just monthly but even daily reserves an institution may be required to hold for dealing with individual transactions. In some embodiments, the different reserves at different levels require different models in the Reserves Model of FIG. 1. In some embodiments, the reserves for market sectors may be important as well in order to figure out reserve breakdown per sector/region.

Embodiments of the system may be used not just in the medical insurance field, but may be applied for pricing services. In other areas, the system may be used to detect an emerging epidemic in a geographic location based on several future indicators.

An exemplary embodiment that demonstrates how the system of FIG. 1 may be used by a medical insurance company will now be discussed. The insurance company may collect data pertaining to pre-certification, eligibility requests, episodes of care, claims, membership benefits, ASD calls, and prescription data. The insurance company receives this information from various sources, for example, through an information exchange and through direct interaction with health care providers or indirectly through patients or users on the insurance company's website.

The collected data is aggregated and stored in granular fashion. This means that the data, although aggregated, may be associated with and grouped at an individual member level. After collecting and organizing the data, certain algorithms, such as linear regression and/or other algorithms may be applied to the data. In some instances, the insurance company is able to rank the importance of each collected data or quality of the data based on the age of the data. For example, the insurance company may place more importance on data gathered two months ago relative to data gathered a year ago due to, for example, fluctuation in healthcare prices. The linear regression applied to the data provides information regarding the reserves required for the current model. This reserves information is stored in the Reserves Estimates database 118 of FIG. 1.

Figure 2:
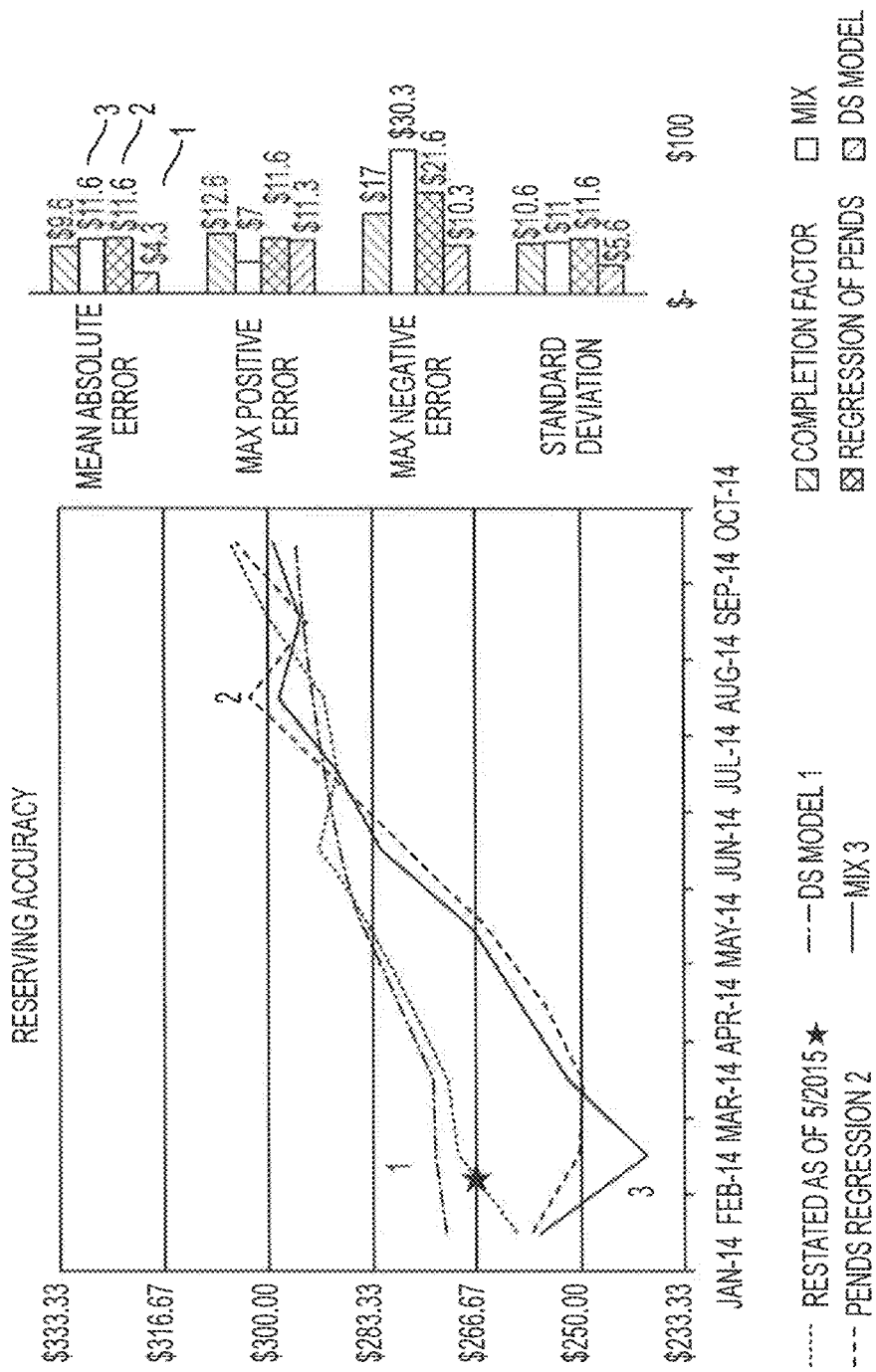
FIG. 2 provides an exemplary graphical comparison between different methods of predicting required reserves.

FIG. 2 illustrates an example visualizing a reserves result when using the system of FIG. 1 to predict reserves required. The medical insurance company is able to generate data on a monthly basis, and applying different algorithms, the system of FIG. 1 is shown to provide a better estimate of actual claims and is shown to have lower variability than existing methods. The system of FIG. 1 uses a Data Science (DS) Model which is labeled as "1." The claims data is starred and as can be shown, the other methods, labeled as "2" and "3" do not track the claims data as well as the system of FIG. 1. The mean absolute error is the least for "1," and the standard deviation is the lowest as well.

Figure 3:
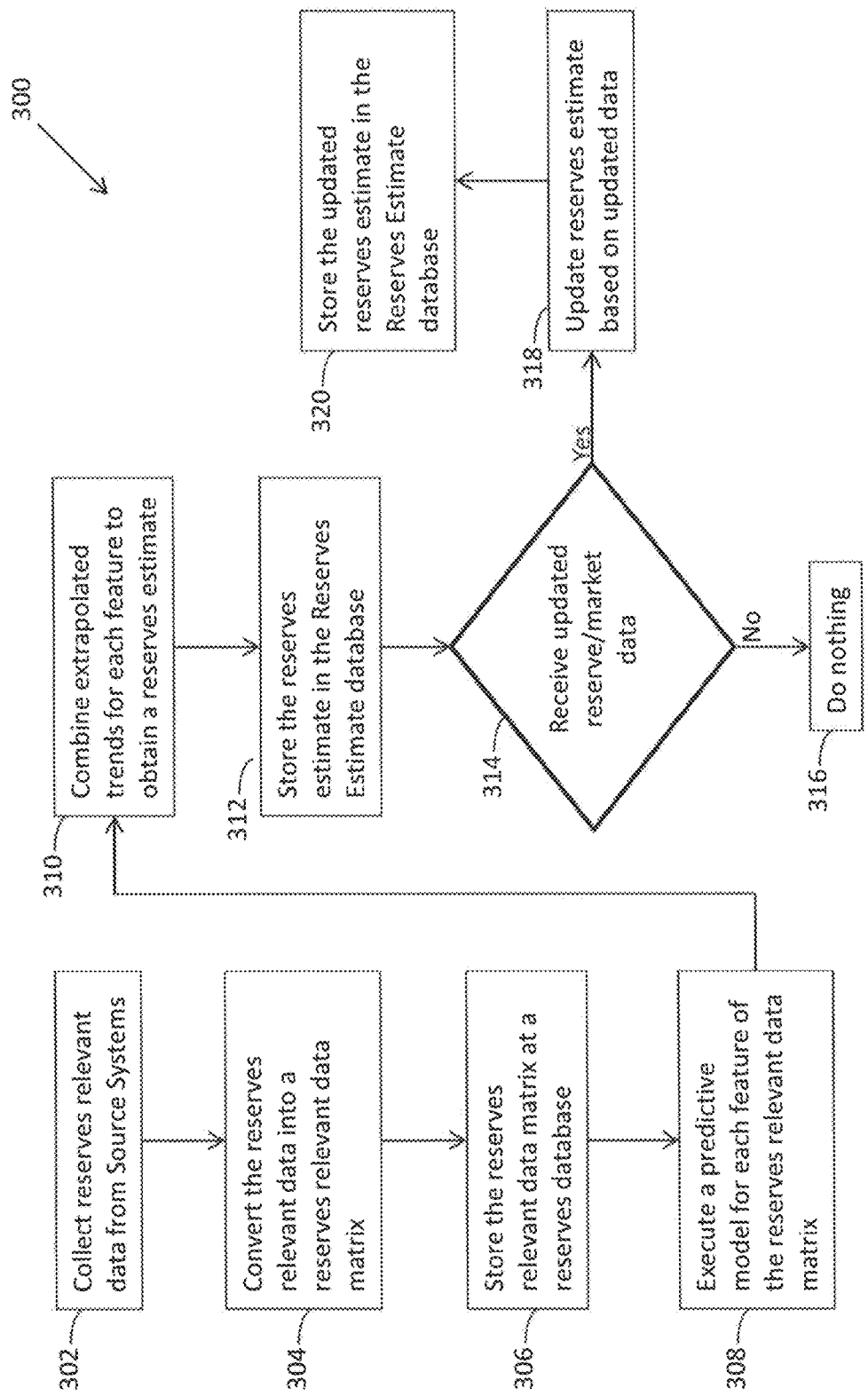
FIG. 3 provides a method of estimating reserves for a financial institution using the system of FIG. 1.

FIG. 3 illustrates a method of estimating reserves 300 for a financial institution using the reserves determination system 100 of FIG. 1. At step 302, the Data Platform 102 collects the reserves relevant data from the Source Systems 104. At step 304, the Data Platform 102 converts the reserves relevant data into a plurality of features organized over a system defined time period into a reserves relevant data matrix. At step 306, the Data Platform 102 stores the reserves relevant data matrix at the Reserves database 114. At step 308, the Reserves Model 116 executes a data/predictive model for each feature of the reserves relevant data matrix to obtain a data trend for each feature. At step 310, the Reserves Model 116 combines each extrapolated trend for each feature to obtain a reserves estimate over the system defined time period. As discussed above, in certain embodiments, at step 310, the Reserves Model 116 also may apply a weighting factor for each trend prior to combining with other weighted trends. At step 312, the reserves estimate is stored in the Reserves Estimate database 118.

At step 314, the Data Platform 102 (see FIG. 1) determines whether updated reserves and/or market data has been received. Updated reserves data would be additional reserves relevant data from the Source Systems 104 being utilized to supplement the reserves estimate stored in the Reserves Estimate database 118. Updated market data is received from the Analytic Solutions 106 and may be utilized to update the reserves estimate based on the specific market data. For instance, an example of relevant market data may be a proportion of members in the relevant market, a historical claims volume in the relevant market or the types of insurance plans offered. If the Data Platform 102 determines that no updated reserves and/or market data has been received, then the Data Platform 102 does nothing, at step 316. If the Data Platform 102 determines that updated reserves and/or market data has been received, then, at step 318, the Reserves Model 116 updates the reserves estimate based on the updated reserves and/or market data. At step 320, the updated reserves estimate is stored at the Reserves Estimate database 118.

Figure 4:
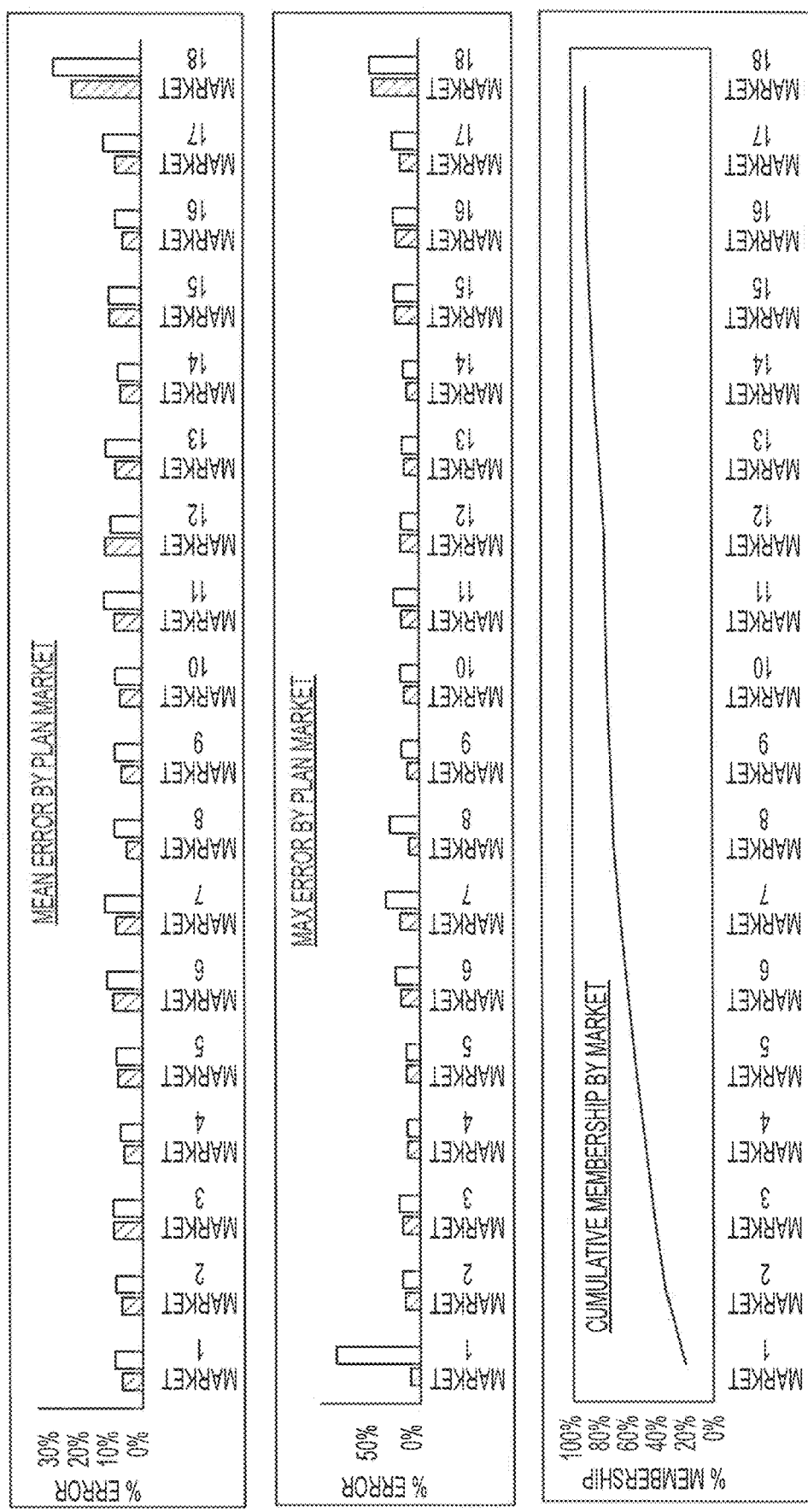
FIG. 4 provides an estimation of localized reserves modeling, according to an exemplary embodiment.

FIG. 4 illustrates an estimation of localized reserves modeling, according to an exemplary embodiment. FIG. 4 shows three charts, one illustrating a mean error comparison between two data models per various local markets/geographic regions. Another chart illustrates a max error comparison between the two data models per the same local markets. The third chart illustrates the cumulative membership of the financial institution (such as an insurance company) in the various local markets. These charts would be useful in determining a combination of various data types from the Source Systems 104 (see FIG. 1) and the type of predictive model utilized to give the best results in the reserves estimate. The percent error determination is determined by comparing actual reserves data from the past against a prediction made over the same time period.

Turning now to FIGS. 5-10, various embodiments of the Analytic Solutions 106 (see FIG. 1) are illustrated. Each of these figures represents an embodiment of a user interface/data analysis tool embodied by Analytic Solutions 106. Utilizing Analytic Solutions 106, a user is able to review reserves estimate data from the Data Platform 102 and select and/or update the various models applied by the Reserves Model 116 and collected data from the Source Systems 104. Further, the user may also provide updated market data to the Data Platform 102 as well as update any system defined time period over which data is collected in order to make a reserves estimate.

Figure 5:
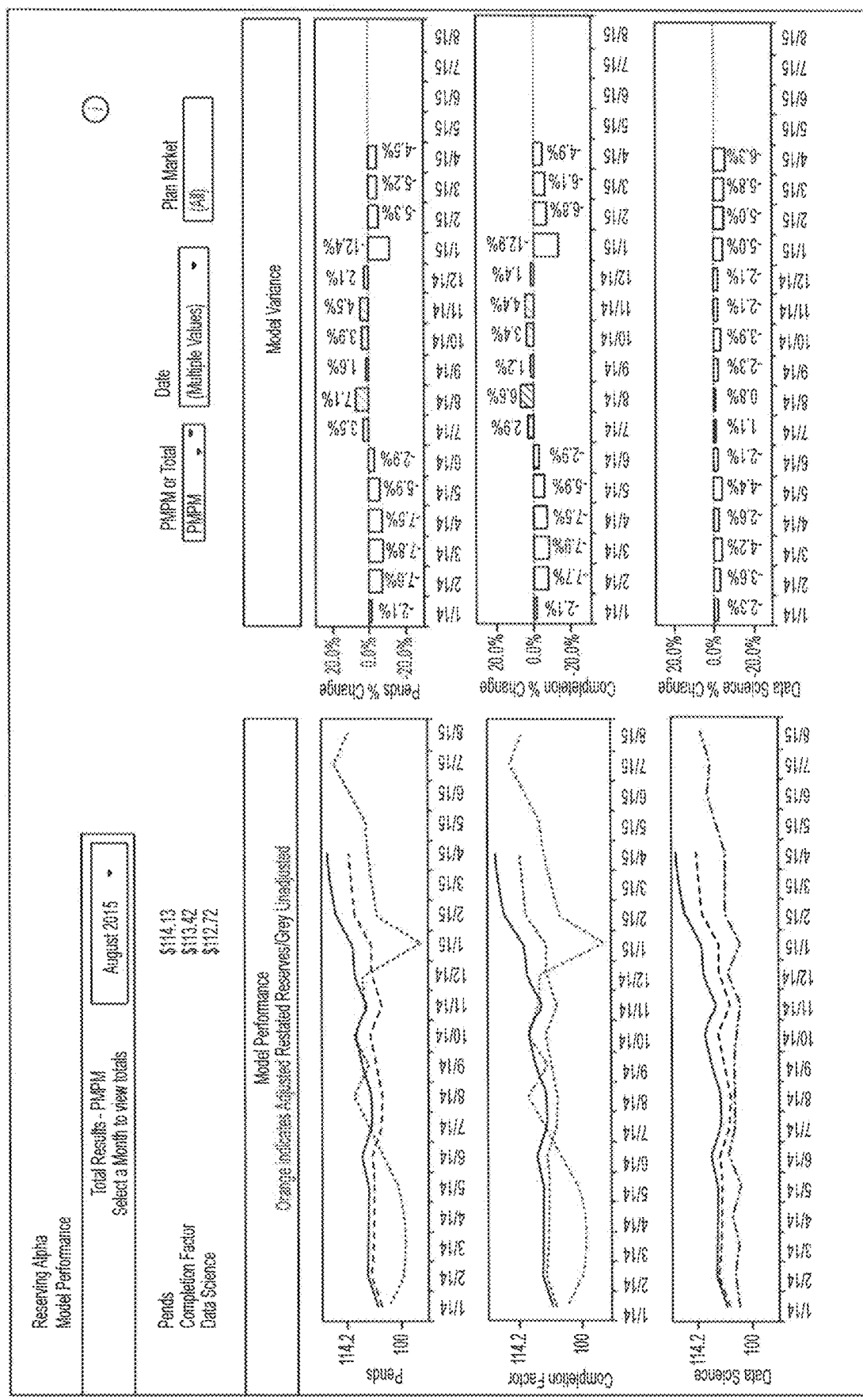
FIG. 5 provides a screen shot of a data visualization tool, according to an embodiment of the disclosure.

The Analytic Solutions 106 illustrated in FIG. 5 provides a comparison of three models: Pends, Completion Factor and Data Science. For each model, three curves are depicted in the charts on the left. The curve labeled "1" is an unadjusted restated reserves over a specified time period. The curve labeled "2" is an adjusted restated reserves over the specified time period. The curve labeled "3" is a comparison of one of the three models over the specified time period. The charts on the right side of the illustration represent the percent error between the adjusted restated reserves and the model. As can be seen, the Data Science model provides the least error between the adjusted restated reserves and the model prediction.

Figure 6:
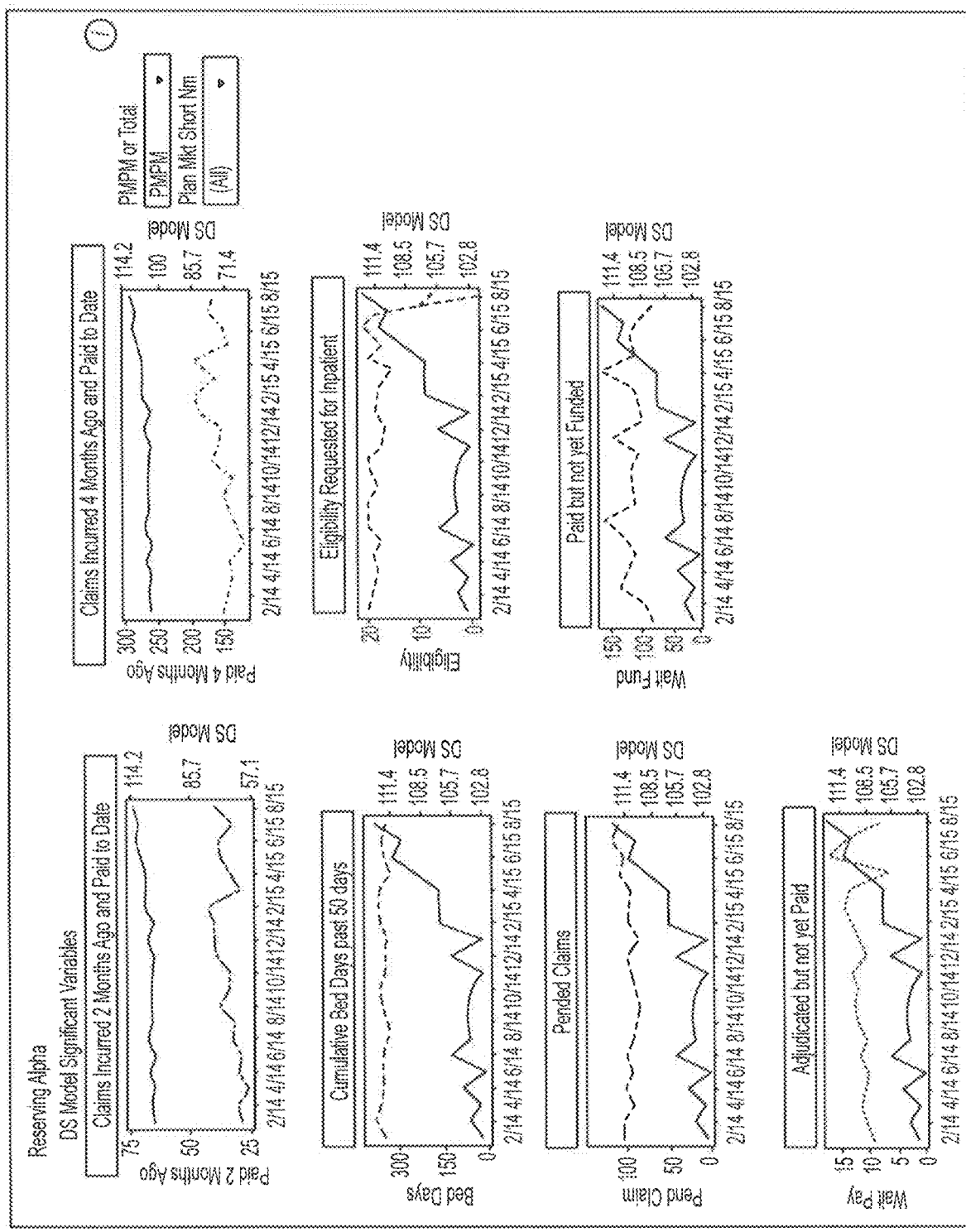
FIG. 6 provides another screen shot of the data visualization tool, according to an embodiment of the disclosure.

The Analytic Solutions 106 illustrated in FIG. 6 provides charts of various factors organized in the reserves relevant data matrix over the system defined time period. Each chart includes two curves: the curve labeled "1" illustrates actual data from the Source Systems 104; and the curve labeled "2" illustrates the predicted trend for that particular data from the Source Systems 104 that is used to formulate the reserves estimate. This embodiment of the Analytic Solutions 106 allows a user to view specific factor based data points utilized in the predictive models.

Figure 7:
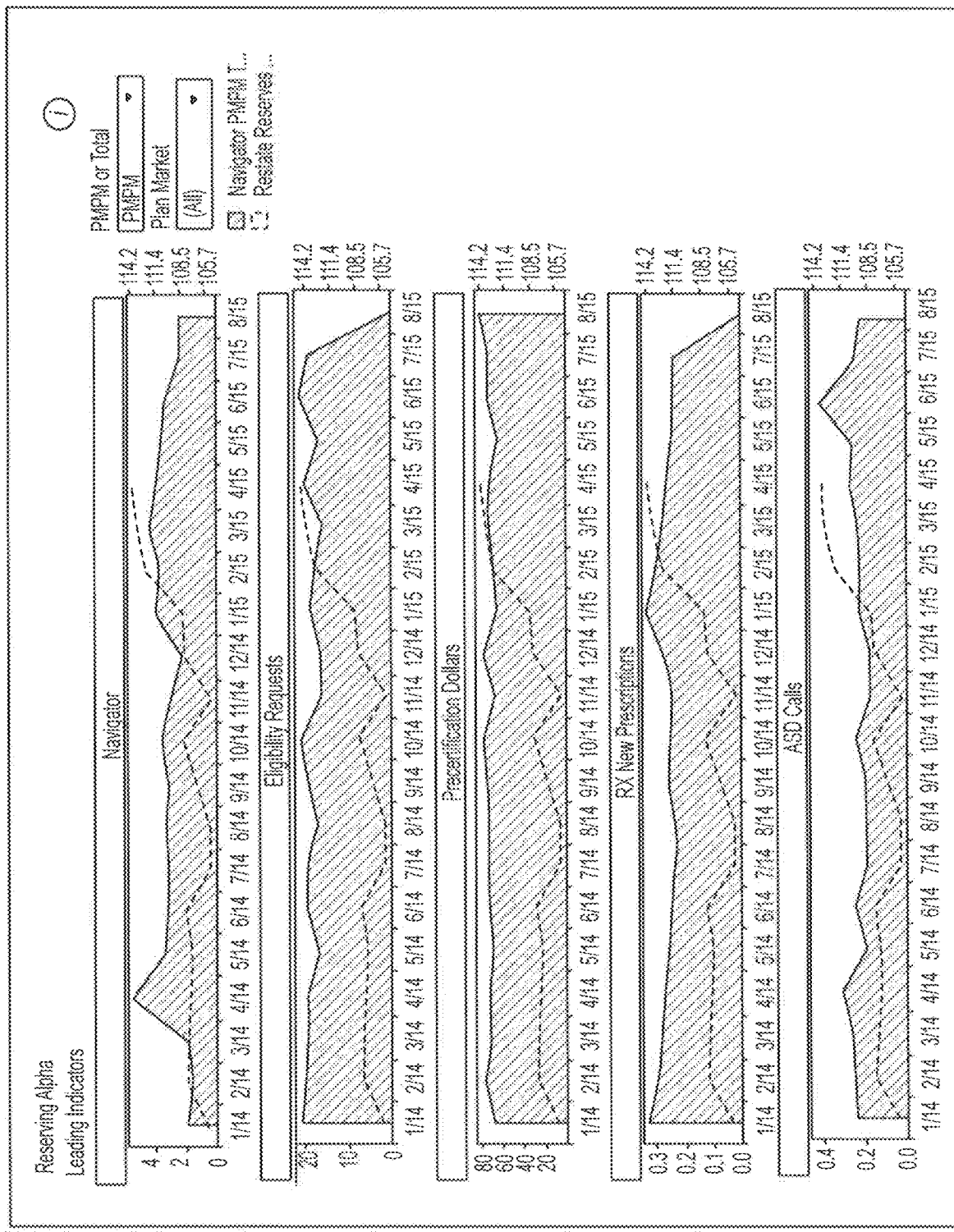
FIG. 7 provides another screen shot of the data visualization tool, according to an embodiment of the disclosure.

The Analytic Solutions 106 illustrated in FIG. 7 provides a collection of charts illustrating the most relevant factors/data collected from the Source Systems 104 (see FIG. 1). As illustrated, each chart shows a comparison between the data collected from the Source Systems 104 that is most relevant to predicting the restated reserves. Each chart shows a curve "1" that shows the restated reserves, and a second curve labeled "2" that shows data collected from the Source Systems 104. Utilizing the Analytic Solutions 106 shown in FIG. 7, a user is able to review the most relevant data collected from the Source Systems 104. This data may allow the user to change and update various types of data to provide to the predictive models.

Figure 8:
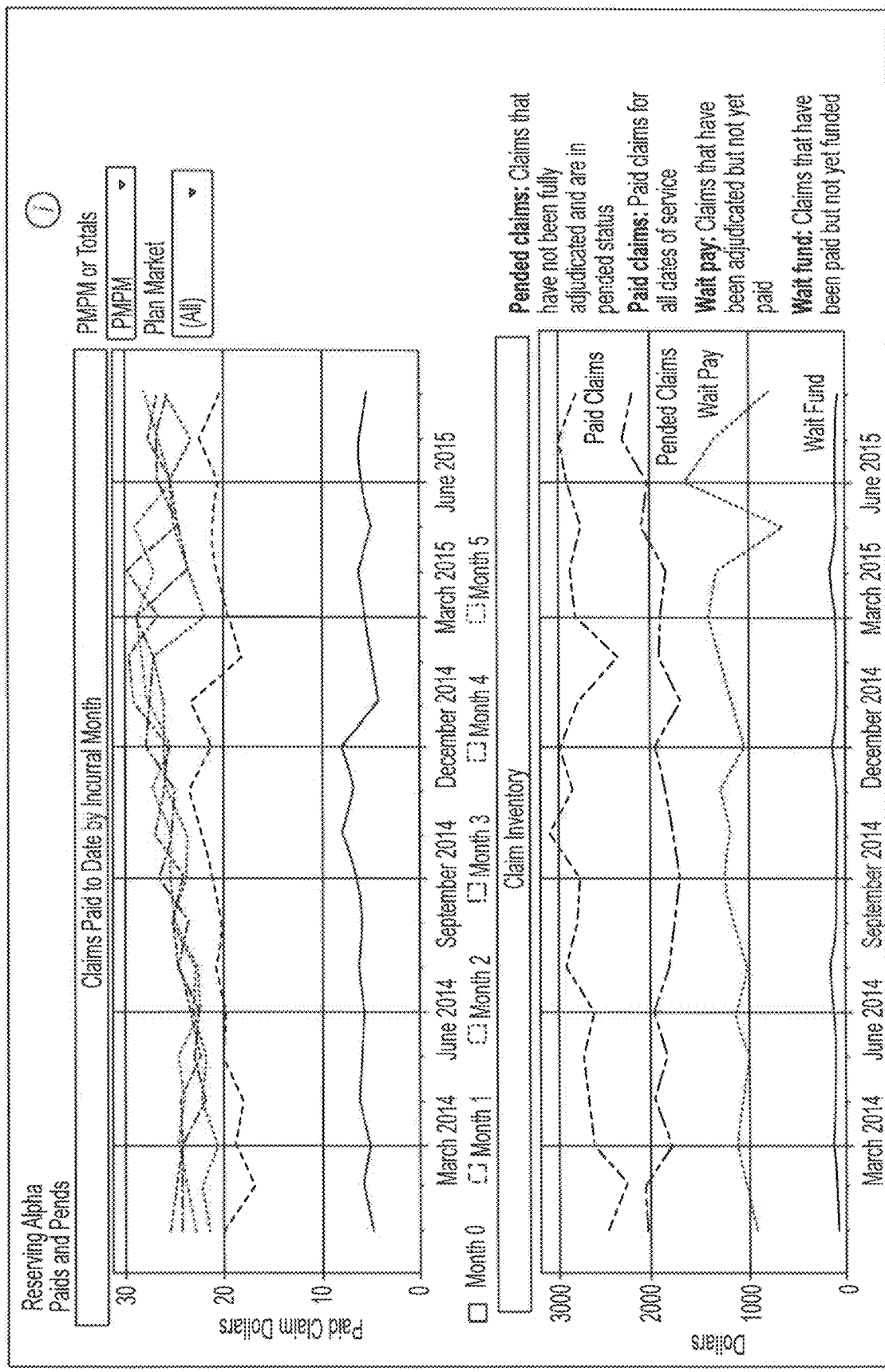
FIG. 8 provides another screen shot of the data visualization tool, according to an embodiment of the disclosure.

The Analytic Solutions 106 illustrated in FIG. 8 provides a comparison of claims data collected from Source Systems 104. FIG. 8 shows two charts. The top chart illustrates a number of paid claims over a period of months. The bottom chart illustrates an amount of dollars appropriated for paid claims, pended claims, wait pay, and wait fund over a period of months.

Figure 9:
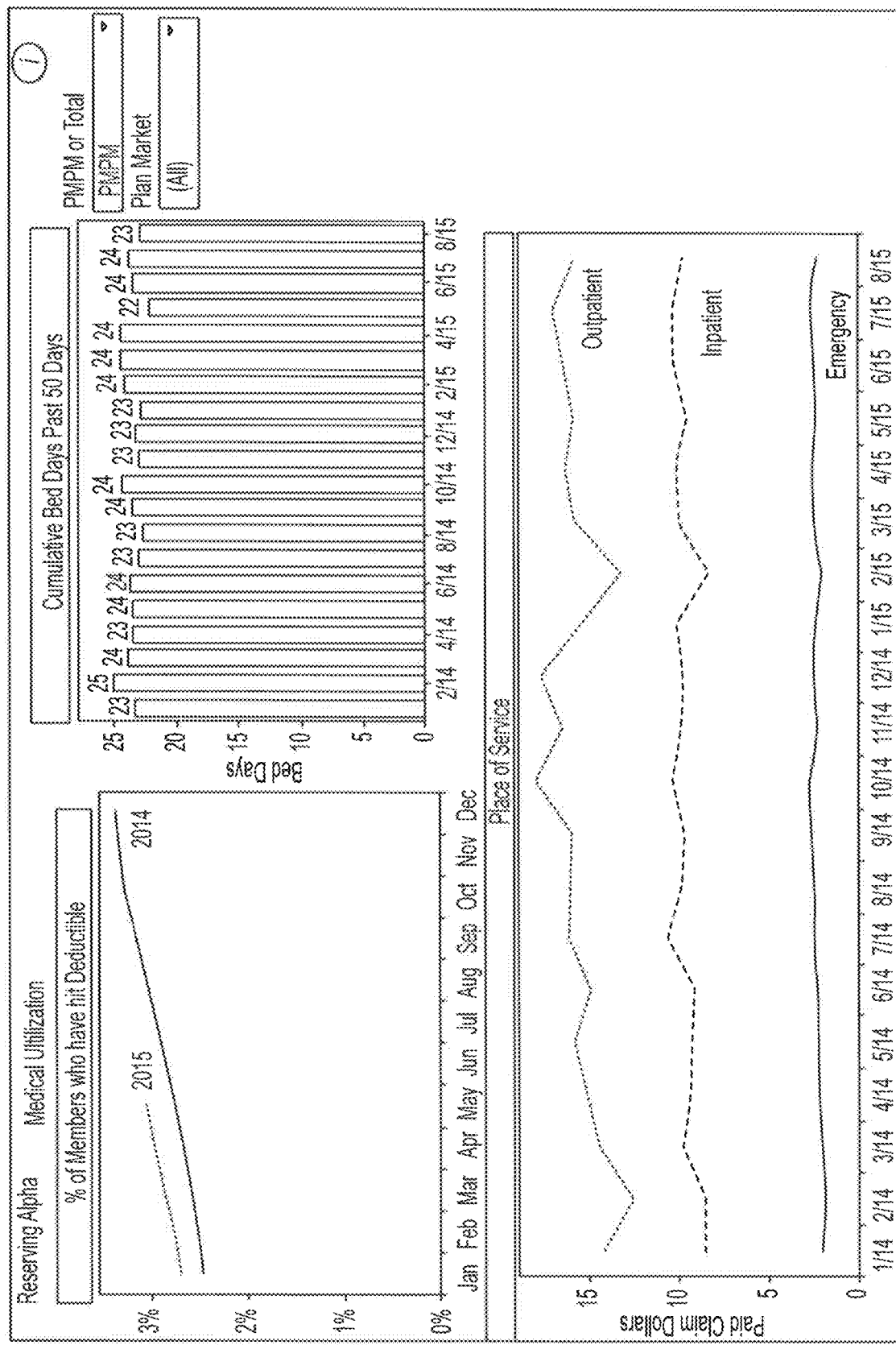
FIG. 9 provides another screen shot of the data visualization tool, according to an embodiment of the disclosure.

The Analytic Solutions 106 illustrated in FIG. 9 provides three charts showing medical utilization. The chart on the top-left portion of FIG. 9 illustrates a percentage of members that have reached their deductible. Each curve illustrates the percentage of members to reach their deductible over a period of months during a certain calendar year—2014 and 2015, as illustrated. The chart on the top-right of FIG. 9 illustrates a cumulative number of bed days over a period of 50 days. The chart at the bottom of FIG. 9 illustrates an amount of paid claim dollars for three places of claim service: (1) outpatient, (2) inpatient, and (3) emergency. Each of these charts illustrates a type of data collected from Source Systems 104 and organized into features over a system defined time period in the reserves relevant data matrix, as discussed in relation to FIG. 1.

Figure 10:
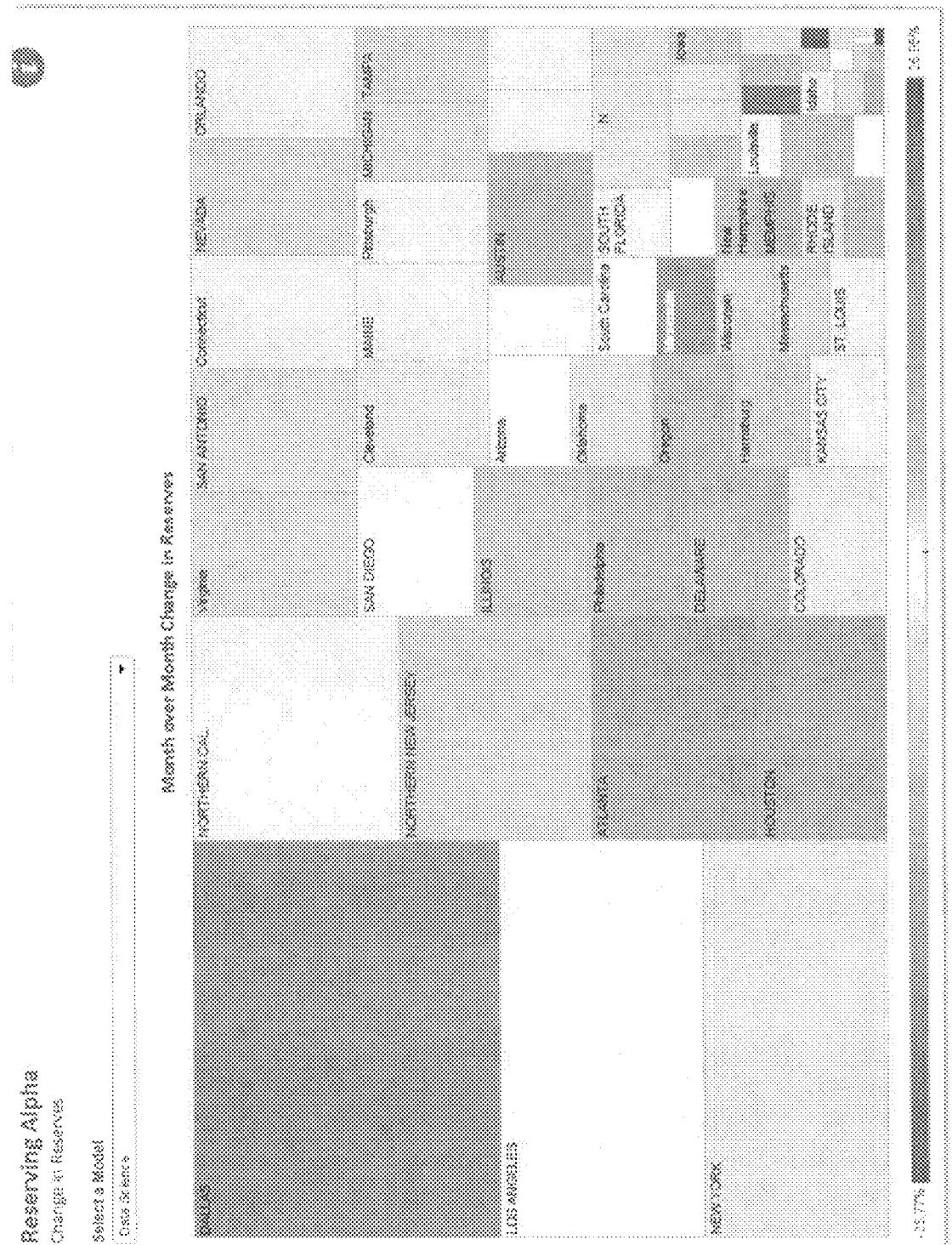
FIG. 10 provides another screen shot of the data visualization tool, according to an embodiment of the disclosure.

The Analytic Solutions 106 illustrated in FIG. 10 provides a single chart that shows a predicted monthly change in reserves estimated using the previously discussed Data Sciences model. The chart shows a plurality of geographic locations and a shading that reflects a percentage change in reserves for the month for that specific geographic location. This chart is useful for determining how the reserves estimate is predicting an allocation of reserves for a plurality of local geographic regions.

Figure 11:
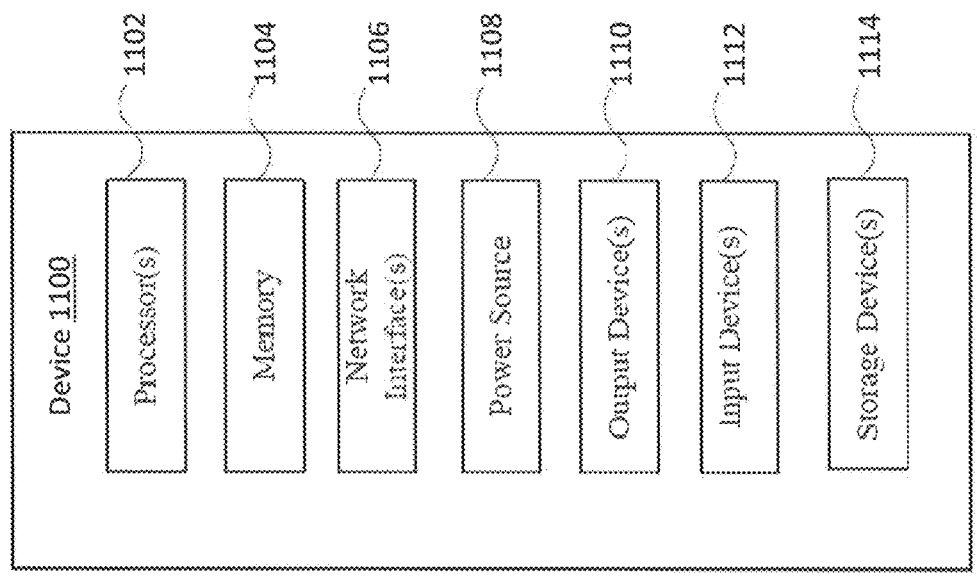
FIG. 11 provides an electronic device according to an embodiment of the disclosure.

FIG. 11 illustrates an electronic device 1100 according to an embodiment of the disclosure. Electronic devices, for example, servers and terminals comprising the Source Systems 104, the Data Platform 102 and the Analytic Solutions 106, in certain embodiments, may be computer devices as shown in FIG. 11. The device 1100 may include one or more processors 1102, memory 1104, network interfaces 1106, power source 1108, output devices 1110, input devices 1112, and storage devices 1114. Although not explicitly shown in FIG. 11, each component provided is interconnected physically, communicatively, and/or operatively for inter-component communications in order to realize functionality ascribed to the various entities identified in FIG. 11. To simplify the discussion, the singular form will be used for all components identified in FIG. 11 when appropriate, but the use of the singular does not limit the discussion to only one of each component. For example, multiple processors may implement functionality attributed to processor 1102.

Processor 1102 is configured to implement functions and/or process instructions for execution within device 1100. For example, processor 1102 executes instructions stored in memory 1104 or instructions stored on a storage device 1114. In certain embodiments, instructions stored on storage device 1114 are transferred to memory 1104 for execution at processor 1102. Memory 1104, which may be a non-transient, computer-readable storage medium, is configured to store information within device 1100 during operation. In some embodiments, memory 1104 includes a temporary memory that does not retain information stored when the device 1100 is turned off. Examples of such temporary memory include volatile memories such as random access memories (RAM), dynamic random access memories (DRAM), and static random access memories (SRAM). Memory 1104 also maintains program instructions for execution by the processor 1102 and serves as a conduit for other storage devices (internal or external) coupled to device 1100 to gain access to processor 1102.

Storage device 1114 includes one or more non-transient computer-readable storage media. Storage device 1114 is provided to store larger amounts of information than memory 1104, and in some instances, configured for long-term storage of information. In some embodiments, the storage device 1114 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 1106 are used to communicate with external devices and/or servers. The device 1100 may comprise multiple network interfaces 1106 to facilitate communication via multiple types of networks. Network interfaces 1106 may comprise network interface cards, such as Ethernet cards, optical transceivers, radio frequency transceivers, or any other type of device that can send and receive information. Non-limiting examples of network interfaces 1106 include radios compatible with several Wi-Fi standards, 3G, 4G, Long-Term Evolution (LTE), Bluetooth®, etc.

Power source 1108 provides power to device 1100. For example, device 1100 may be battery powered through rechargeable or non-rechargeable batteries utilizing nickel-cadmium or other suitable material. Power source 1108 may include a regulator for regulating power from the power grid in the case of a device plugged into a wall outlet, and in some devices, power source 1108 may utilize energy scavenging of ubiquitous radio frequency (RF) signals to provide power to device 1100.

Device 1100 may also be equipped with one or more output devices 1110. Output device 1110 is configured to provide output to a user using tactile, audio, and/or video information. Examples of output device 1110 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user.

Device 1100 is equipped with one or more input devices 1112. Input devices 1112 are configured to receive input from a user or the environment where device 1100 resides. In certain instances, input devices 1112 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for device 1100 are functionally and communicatively coupled to achieve certain behaviors. In some embodiments, these behaviors are controlled by software running on an operating system of device 1100.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for estimating reserves for a medical insurance carrier having a plurality of members who are consumers of the medical insurance carrier's medical insurance products, wherein the method uses a data platform configured to collect data from one or more member data source systems, the method comprising:

collecting, by a first extract, transform and load (first ETL) system of the data platform, reserves relevant data from the one or more member data source systems over a system defined time period, wherein the one or more data source systems comprises of an Electronic Data Interchange (EDI) and a Real-Time Eligibility (RTE) processing database comprising member eligibility data, wherein the member eligibility data is processed in parallel using a network of many computers and distributed storage and processing techniques;

converting, by the first ETL system, the member eligibility data into a first reserves relevant data matrix in which individual member eligibility data is organized in association with features or variables based on the system defined time period and including associated geographic information;

collecting, by a second extract, transform and load (second ETL) system, an Automated Systems Design (ASD) call center database, and an insurance carrier webpage activity database, wherein the call center database and the webpage activity database contain member data relevant to member interactions with the medical insurance carrier;

converting, by the second ETL system, the member interactions data into a second reserves relevant data matrix in which individual member interaction data is organized in association with features or variables based on the system defined time period and including associated geographic information;

collecting, by the first ETL system, member claims data from a member claims database, and collecting member claims-related data from an enterprise data warehouse (EDW), a membership database, and an insurance plan design database;

combining, by the first ETL system, the member claims data and the member claims-related data into the first reserves relevant data matrix;

combining, by the first and second ETL systems, the first reserves relevant data matrix with the second reserves relevant data matrix to form a third reserves relevant data matrix, wherein the third reserves relevant data matrix comprises a plurality of features associated with individual members and based on the reserves relevant data that are organized based on the system defined time period and geographic locations described by the associated geographic information;

storing, by the data platform, the third reserves relevant data matrix at a reserves database of the data platform;

executing, by the data platform, a predictive model for each of the plurality of features of the reserves relevant data matrix to extrapolate a trend for each individual feature over the system defined time period for each of the geographic locations, wherein executing the predictive model comprises applying a modeling algorithm to the various features collected and organized into the third reserves relevant data matrix;

assigning, by the data platform, a weighting value to each trend for each individual feature;

combining, by the data platform, the weighted trend for each individual feature associated with each individual member for each of the geographic locations to obtain reserves estimate data over the system defined time period for each of the geographic locations;

storing, by the data platform, the reserves estimate data over the system defined time period in a reserves estimate database;

providing, by the data platform, access to the reserves estimate data from the reserves estimate database to a user interface configured to parse the reserves estimate data based on the one or more data source systems, the geographic locations, and the system defined time period; and displaying, by an analytic solutions module, reserves trends in a geographic location to predict reserves requirements or predict emerging medical emergencies.

2. The method of claim 1, wherein the member data includes date information for each of a plurality of member data points of the member data.

3. The method of claim 2, wherein a format of the member data is converted to member-by-date data, wherein the member-by-date data contains the plurality of member data points associated with the date information.

4. The method of claim 1, wherein the reserves relevant data comprises pre-certification data, and wherein the step of collecting the reserves relevant data comprises collecting the pre-certification data from one or more pre-certification input source systems over the system defined time period.

5. The method of claim 4, wherein the reserves relevant data comprises prescription data, and wherein the step of collecting the reserves relevant data comprises collecting the prescription data from one or more prescription input source systems over the system defined time period.

6. The method of claim 1, wherein reserves relevant data comprises one or more of pre-certification data, prescription data, weather data, insurance carrier navigator data, and insurance carrier call log data.

7. The method of claim 1, wherein the predictive model is one of a linear regression, a non-linear regression, a support vector machine, a neural network, a decision tree, a random forest, or a time series analysis.

8. A method for geographically allocating reserves for a medical insurance carrier having a plurality of members who are consumers of the medical insurance carrier's medical insurance products, wherein the method uses a data platform configured to collect data from one or more member data source systems, the method comprising:
- collecting, by a first extract, transform and load (first ETL) system of the data platform, reserves relevant data from the one or more member data source systems over a system defined time period, wherein the one or more data source systems comprises of an Electronic Data Interchange (EDI) and a Real-Time Eligibility (RTE) processing database comprising member eligibility data, wherein the member eligibility data is processed in parallel using a network of many computers and distributed storage and processing techniques;
- converting, by the first ETL system, the member eligibility data into a first reserves relevant data matrix in which individual member eligibility data is organized in association with features or variables based on the system defined time period and including associated geographic information;
- collecting, by a second extract, transform and load (second ETL) system, an Automated Systems Design (ASD) call center database, and an insurance carrier webpage activity database, wherein the call center database and the webpage activity database contain member data relevant to member interactions with the medical insurance carrier;
- converting, by the second ETL system, the member interactions data into a second reserves relevant data matrix in which individual member interaction data is organized in association with features or variables based on the system defined time period and including associated geographic information;
- collecting, by the first ETL system, member claims data from a member claims database, and collecting member claims-related data from an enterprise data warehouse (EDW), a membership database, and an insurance plan design database;
- combining, by the first ETL system, the member claims data and the member claims-related data into the first reserves relevant data matrix;
- combining, by the first and second ETL systems, the first reserves relevant data matrix with the second reserves relevant data matrix to form a third reserves relevant data matrix, wherein the third reserves relevant data matrix comprises a plurality of features associated with individual members and based on the reserves relevant data that are organized based on the system defined time period and geographic locations described by the associated geographic information;
- storing, by the data platform, the third reserves relevant data matrix at a reserves database of the data platform;
- executing, by the data platform, a predictive model for each of the plurality of features of the reserves relevant data matrix to extrapolate a trend for each individual feature over the system defined time period for each of the geographic locations, wherein executing the predictive model comprises applying a modeling algorithm to the various features collected and organized into the third reserves relevant data matrix;
- assigning, by the data platform, a weighting value to each trend for each individual feature;
- combining, by the data platform, the weighted trend for each individual feature associated with each individual member for each of the geographic locations to obtain reserves estimate data over the system defined time period for each of the geographic locations;
- storing, by the data platform, the reserves estimate data over the system defined time period in a reserves estimate database;
- providing, by the data platform, access to the reserves estimate data from the reserves estimate database to a user interface configured to parse the reserves estimate data based on the one or more data source systems, the geographic locations, and the system defined time period; and
- displaying, by an analytic solutions module, reserves trends in a geographic location to predict reserves requirements or predict emerging medical emergencies.

9. The method of claim 8, wherein the member data includes date information for each of a plurality of member data points of the member data.

10. The method of claim 9, wherein a format of the member data is converted to member-by-date data, wherein the member-by-date data contains the plurality of member data points associated with the date information.

11. The method of claim 8, wherein the reserves relevant data comprises pre-certification data, and wherein the step of collecting the reserves relevant data comprises collecting the pre-certification data from one or more pre-certification input source systems from the geographic locations over the system defined time period.

12. The method of claim 11, wherein the reserves relevant data comprises prescription data, and wherein the step of collecting the reserves relevant data comprises collecting the prescription data from one or more prescription input source systems from the geographic locations over the system defined time period.

13. The method of claim 8, wherein reserves relevant data comprises one or more of pre-certification data, prescription data, weather data, insurance carrier navigator data, and insurance carrier call log data.

14. The method of claim 8, wherein the predictive model is one of a linear regression, a non-linear regression, a support vector machine, a neural network, a decision tree, a random forest, or a time series analysis.

15. A non-transitory computer readable medium containing computer executable instructions for estimating reserves for a medical insurance carrier having a plurality of members who are consumers of the medical insurance carrier's insurance products, and using a data platform configured to collect data from one or more member data source systems, the computer readable instructions, when executed by a processor, cause the processor to perform steps comprising:

collecting, by a first extract, transform and load (first ETL) system of the data platform, reserves relevant data from the one or more member data source systems over a system defined time period, wherein the one or more data source systems comprises of an Electronic Data Interchange (EDI) and a Real-Time Eligibility (RTE) processing database comprising member eligibility data, wherein the member eligibility data is processed in parallel using a network of many computers and distributed storage and processing techniques;

converting, by the first ETL system, the member eligibility data into a first reserves relevant data matrix in which individual member eligibility data is organized in association with features or variables based on the system defined time period and including associated geographic information;

collecting, by a second extract, transform and load (second ETL) system, an Automated Systems Design (ASD) call center database, and an insurance carrier webpage activity database, wherein the call center database and the webpage activity database contain member data relevant to member interactions with the medical insurance carrier;

converting, by the second ETL system, the member interactions data into a second reserves relevant data matrix in which individual member interaction data is organized in association with features or variables based on the system defined time period and including associated geographic information;

collecting, by the first ETL system, member claims data from a member claims database, and collecting member claims-related data from an enterprise data warehouse (EDW), a membership database, and an insurance plan design database;

combining, by the first ETL system, the member claims data and the member claims-related data into the first reserves relevant data matrix;

combining, by the first and second ETL systems, the first reserves relevant data matrix with the second reserves relevant data matrix to form a third reserves relevant data matrix, wherein the third reserves relevant data matrix comprises a plurality of features associated with individual members and based on the reserves relevant data that are organized based on the system defined time period and geographic locations described by the associated geographic information;

storing, by the data platform, the third reserves relevant data matrix at a reserves database of the data platform;

executing, by the data platform, a predictive model for each of the plurality of features of the reserves relevant data matrix to extrapolate a trend for each individual feature over the system defined time period for each of the geographic locations, wherein executing the predictive model comprises applying a modeling algorithm to the various features collected and organized into the third reserves relevant data matrix;

assigning, by the data platform, a weighting value to each trend for each individual feature;

combining, by the data platform, the weighted trend for each individual feature associated with each individual member for each of the geographic locations to obtain reserves estimate data over the system defined time period for each of the geographic locations;

storing, by the data platform, the reserves estimate data over the system defined time period in a reserves estimate database;

providing, by the data platform, access to the reserves estimate data from the reserves estimate database to a user interface configured to parse the reserves estimate data based on the one or more data source systems, the geographic locations, and the system defined time period; and displaying, by an analytic solutions module, reserves trends in a geographic location to predict reserves requirements or predict emerging medical emergencies.

16. The method of claim 15, wherein the member data includes date information for each of a plurality of member data points of the member data.

17. The method of claim 16, wherein a format of the member data is converted to member-by-date data, wherein the member-by-date data contains the plurality of member data points associated with the date information.

18. The method of claim 15, wherein the reserves relevant data comprises pre-certification data, and wherein the step of collecting the reserves relevant data comprises collecting the pre-certification data from one or more pre-certification input source systems over the system defined time period.

19. The method of claim 18, wherein the reserves relevant data comprises prescription data, and wherein the step of collecting the reserves relevant data comprises collecting the prescription data from one or more prescription input source systems over the system defined time period.

20. The method of claim 15, wherein reserves relevant data comprises one or more of pre-certification data, prescription data, weather data, insurance carrier navigator data, and insurance carrier call log data.

21. The method of claim 15, wherein the predictive model is one of a linear regression, a non-linear regression, a support vector machine, a neural network, a decision tree, a random forest, or a time series analysis.

* * * * *